(12) United States Patent
Chan

(10) Patent No.: US 8,806,550 B1
(45) Date of Patent: Aug. 12, 2014

(54) RULES ENGINE FOR TROUBLESHOOTING VIDEO CONTENT DELIVERY NETWORK

(75) Inventor: Jason Chan, Mountain View, CA (US)

(73) Assignee: TV2 Consulting, LLC, Palo Alto, CA (US)

( * ) Notice: Subject to any disclaimer, the term of this patent is extended or adjusted under 35 U.S.C. 154(b) by 62 days.

(21) Appl. No.: 13/286,312

(22) Filed: Nov. 1, 2011

(51) Int. Cl.
*H04N 17/02* (2006.01)
*H04N 17/00* (2006.01)
*H04N 21/61* (2011.01)

(52) U.S. Cl.
CPC ......... *H04N 17/004* (2013.01); *H04N 21/6168* (2013.01)
USPC ........................................ 725/107; 725/100

(58) Field of Classification Search
CPC .......................... H04N 17/004; H04N 21/6168
USPC ................................ 725/107; 709/224; 726/22
See application file for complete search history.

(56) References Cited

U.S. PATENT DOCUMENTS

| | | | |
|---|---|---|---|
| 6,598,229 B2 * | 7/2003 | Smyth et al. ................... | 725/107 |
| 7,321,526 B2 | 1/2008 | Todd et al. | |
| 7,664,844 B2 | 2/2010 | Di Luoffo et al. | |
| 7,801,127 B2 | 9/2010 | Beeson et al. | |
| 7,848,237 B2 | 12/2010 | Todd et al. | |
| 8,045,476 B2 * | 10/2011 | Mehta et al. ................... | 370/242 |
| 8,339,968 B2 * | 12/2012 | Howe et al. ..................... | 370/242 |
| 2002/0007492 A1 * | 1/2002 | Smyth et al. ................... | 725/107 |
| 2004/0261114 A1 * | 12/2004 | Addington et al. ........... | 725/106 |
| 2007/0050826 A1 * | 3/2007 | Bowen et al. ..................... | 725/87 |
| 2008/0086657 A1 * | 4/2008 | Chen et al. ......................... | 714/3 |
| 2009/0122879 A1 * | 5/2009 | Howe et al. .............. | 375/240.27 |
| 2009/0158096 A1 | 6/2009 | Ali et al. | |
| 2010/0161574 A1 * | 6/2010 | Davidson et al. ............. | 707/705 |
| 2010/0223499 A1 * | 9/2010 | Panigrahy et al. ............... | 714/19 |

* cited by examiner

*Primary Examiner* — Nasser Goodarzi
*Assistant Examiner* — Michael B Pierorazio
(74) *Attorney, Agent, or Firm* — File-EE-Patents.com; Jay A. Chesavage

(57) ABSTRACT

A rules engine for application of rules to a plurality of log events from a plurality of log and event sources has separate threads for the collection of log entries and events, which logs and events are merged together to form a merged log events. A rules thread applies the merged events to a series of rules in search of a match condition, where the match condition involves a log source and one or more fields selected from a particular log or event. When a match condition occurs according to criteria specified by the rule, an action is performed. In one example, the action is the presentation of a distilled message which indicates a corrective action or problem source based on the application of the rules to the merged stream of messages. In another example, multi-tab displays indicate unprocessed logs and the results of applied rules.

18 Claims, 13 Drawing Sheets

Rules Generation

Rules Application

Log and Summary Display

Generalized Log Entry Format

W3C log entry Format

W3C log entry examples 2011-05-24 07:00:30 67.160.1.142 POST /login.asmx - 80 - 192.168.1.142 STB+AGENT+STRING 200 0 40 73

2011-07-21 00:00:11 10.3.19.17 POST /ClientApplicationFile.dat - 80 - 10.3.0.10 STB+AGENT+STRING 404 2 5 0

Figure 6D
Client Trace Log

| Level | Date | Time | Source | Event_ID | Task_Category |
|---|---|---|---|---|---|

650　652　654　656　658　660

Figure 6E
Client Trace Log Example 650　652　654　656　658　659

Information,6/10/2011 11:04:29 AM,Intel(R) ME Application,1104,WLAN,Management session was established over WLAN interface.

659

Figure 6F
Variable Length Event Log Example 660　662　664　666　668

Timestamp:1311206400 Type:Live Resolution:FULLSCREEN ID:C0A67920-87AC-4820-8FE1-BC53B82596CD Channel:300

670　672　674　676　678

BitRate:2050000 DeliveryMode:MulticastICC BurstOverhead:20 BurstDisabled:true MulticastAddress:239.193.1.10:7534

680　682　684　686　688

Reason:Data timeout Timeout:11000 Name:AV.Tuner.Error Category:AV Severity: Error

Figure 7A
Generalized Rule format

| Date & Time Range 701 | | | |
|---|---|---|---|
| Rule_1 | Which_log | FieldName1=<match_cond> | FieldName2=<match_cond> | ... | Action_if_match Action_if_no_match |
| ... | | | |
| Rule_m | | | |

702   704   706   708

Figure 7B
Rule example – Server (W3C) Log

720: `<Filter type="W3C"` 
722: `desc="Upgrade file unavailable {filename}"`
724: `searchEventName="Application"` 
726: `searchParam="sc-status=404">`
728: `</Filter>`

Figure 7C
Example Log Entry matching rule of fig 7B 2011-07-21 00:00:11 10.3.19.17 POST /ClientApplicationFile.dat – 80 –
10.3.0.10 STB+Agent+String 404 2 5 0

Figure 7D
Rule example – Client Trace Log

740
`<Filter_type="ClientTrace" desc="Tuning from channel {oldChannel} to channel {newChannel} on {IPPort} of type {Type}" searchEventName="Tune">`
742 ... 744

745
```
ClientTrace
EventName=Tune
oldChannel=1
newChannel=2
IPPort=239.0.1.4:7000
Type=HD
```

Figure 7E
Trace Log entry satisfying rule of figure 7D

Figure 7F
Rule example – Unicast Failure in Event Log

750
`<Filter_type="EventLog" desc="unicast server retry" searchparam="EventId=650">`
752 ... 754

755
```
EventLog
Datetime=2011-07-21 00:00:11
Servername=UnicastServer1
EventId=650
Category=AudioVideo
Severity=Information
PacketNumber=1000
Servicename=Channel3
DeviceName=TestSTB
```

Figure 7G
Log example: unicast failure

Figure 7H

Rule example:
Purchase/Play Movie Rules

```
780  <!--Purchase Movie -->
     <Filter type="W3C" desc="Purchase Movie {Name}" searchEventName="PurchaseMovie.asmx"
     searchParam="sc-status=200"id="PurchaseMovie" />

782  <!--Purchase Movie fail -->
     <Filter type="W3C" desc="Purchase Movie {Name}" searchEventName="PurchaseMovie.asmx"
     searchParam="sc-status!=200"id="PurchaseMovie" />

784  <!--Play Movie success
     <Filter type="W3C" desc="Playing Movie {Name}" searchEventName="PlayMovie.asmx"
     searchParam="sc-status=200" dependency="PurchaseMovie" />

786  <!--Play Movie fail
     <Filter type="W3C" desc="Playing Movie {Name}" searchEventName="PlayMovie.asmx"
     searchParam="sc-status!=200" dependency="PurchaseMovie" />
```

Figure 7I
W3C Log example:
Purchase/Play Movie

790
```
W3C
Date=2011-07-21
Time=00:00:11
ClientIP=10.3.1.10
ClientMethod=GET
Uri=PurchaseMovie.asmx?MovieName=MyMovie
Port=80
ReqIP=65.1.2.3
User_Agent=STB+USER+AGENT
Http_code=200
SvrCode=0
Req_Len=3948
Resp_len=3871
```

792
```
Date=2011-07-21
Time=00:00:12
ClientIP=10.3.1.10
ClientMethod=GET
Uri=PurchaseMovie.asmx?MovieName=MyMovie
Port=80
ReqIP=65.1.2.3
User_Agent=STB+USER+AGENT
Http_code=200
SvrCode=0
Req_Len=1382
Resp_len=3871
```

794
```
Date=2011-07-21
Time=00:00:14
ClientIP=10.3.1.10
ClientMethod=GET
Uri= PlayMovie.asmx?Id=MyMovie
Port=80
ReqIP=65.1.2.3
User_Agent=STB+USER+AGENT
Http_code=200
SvrCode=0
```

Figure 8A

```
<Scenario name="Login">
    <!-- Permission -->
    <Filter type="EventLog" desc="Permission issue - check configuration file" searchParam="EventId=2652" action=""></Filter>

<!-- Login -->
    <Filter type="IIS" desc="Login" searchParam="Bootstrap" searchParam="sc-status=200" ></Filter>

</Scenario>
```
802

```
    <!-- Unable to get Application file -->
    <Filter type="IIS" desc="Unable to find client {filename}" searchEventName="ClientApplication" searchParam="sc-status=404"></Filter>

<!-- Need to check for upgrade download within 5 mins? -->
    <Filter type="IIS" desc="Determining client upgrade file" searchEventName="upgrade" searchParam="sc-status=200" ExpirySeconds="300"></Filter>

<!-- Downloaded client files success -->
    <Filter type="IIS" desc="Upgraded client {filename}" searchEventName="ClientApplication" searchParam="sc-status=200"></Filter>

</Scenario>
```
804

*Figure 8B*

```
802  <!--Download firmware -->
     <Filter type="W3C" desc="Downloading firmware" searchEventName="Firmware.dat"
     searchParam="sc-status=200" id="Firmware"></Filter>

804  <!-- Login first request -->
     <Filter type=" W3C " desc="Authenticate" searchEventName="Authenticate"
     searchParam="sc-status=200" " dependency="Firmware" id="Auth"></Filter>

806  <!--Check for invalid STB model -->
     <Filter type="EventLog" desc="STB model not valid" searchEventName="STBModel"
     searchParam="message=invalid" dependency="Firmware" id="InvalidSTB"></Filter>

808  <!-- Login second request within 3s -->
     <Filter type=" W3C " desc="Login" searchEventName="Login" searchParam="sc-status=200"
     dependency="Auth" expirySeconds="3" id="Login"></Filter>

810  <!--Download client application -->
     <Filter type=" W3C " desc="Login" searchEventName="ClientApplication"
     searchParam="sc-status=200" dependency="Auth" expirySeconds="3"></Filter>
```

Figure 8C

W3C log for successful power-on initialization

Log entries for a successful power on
- 820  2011-07-21 00:00:00 10.3.19.17 POST /Firmware.dat - 80 - 10.3.0.10 STB+Agent+String 200 2 5 0
- 822  2011-07-21 00:00:11 10.3.19.17 POST /Auth.asmx - 80 - 10.3.0.10 STB+Agent+String 200 2 5 0
- 824  2011-07-21 00:00:12 10.3.19.17 POST /Login.asmx - 80 - 10.3.0.10 STB+Agent+String 200 2 5 0
- 826  2011-07-21 00:00:13 10.3.19.17 POST /ClientApplication.dat - 80 - 10.3.0.10 STB+Agent+String 200 2 5 0

Figure 8D

W3C and event log for unsuccessful power-on initialization

- 830  2011-07-21 00:00:00 10.3.19.17 POST /Firmware.dat - 80 - 10.3.0.10 STB+Agent+String 200 2 5 0
- 832  2011-07-21 00:00:11 10.3.19.17 POST /Auth.asmx - 80 - 10.3.0.10 STB+Agent+String 200 2 5 0

- 834  EventLog
  DateTime=2011-07-21 00:00:12
  ModelName=STBModel1
  Message=Invalid model not registered in system
  Severity=Error

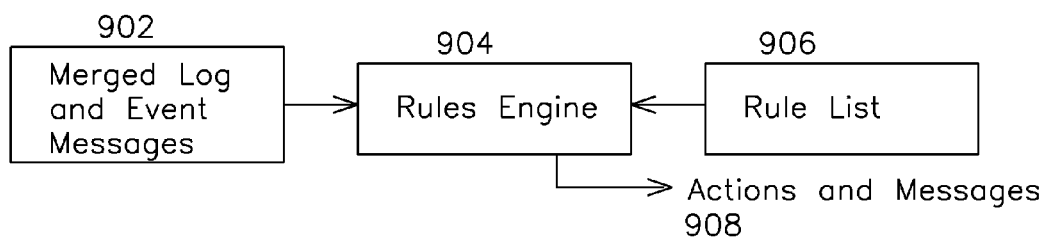
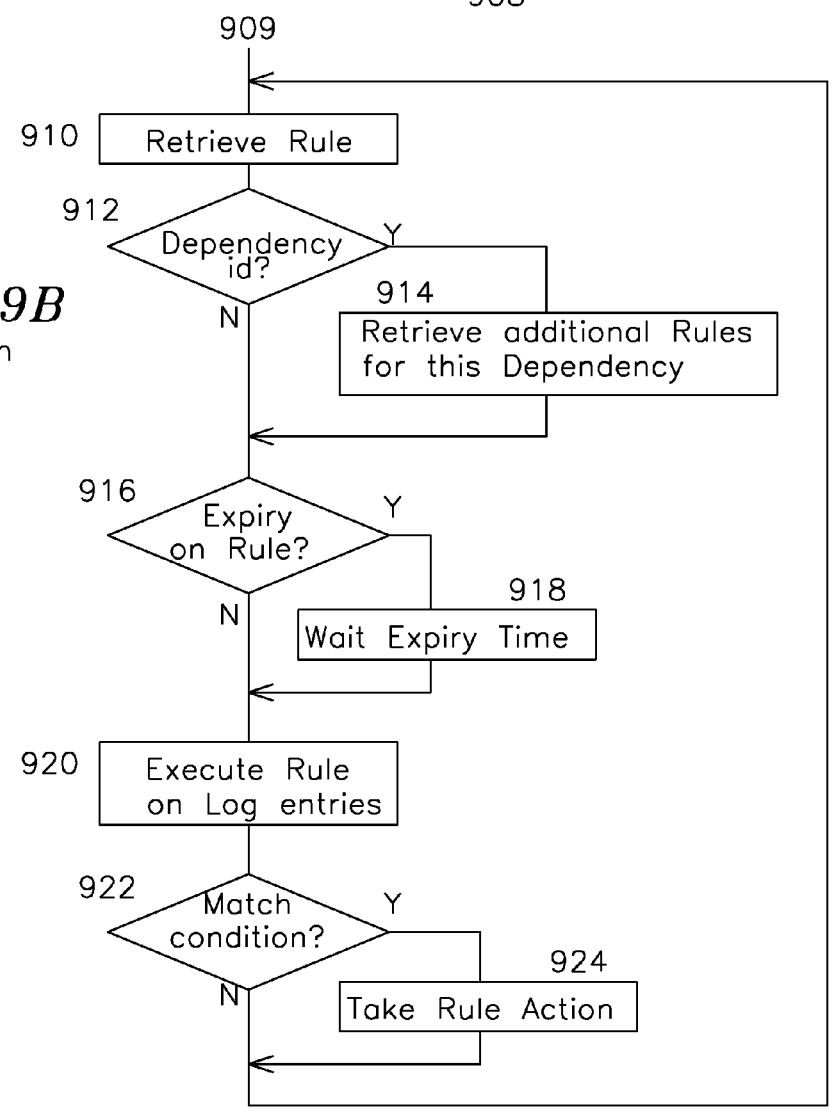

RULES ENGINE FOR TROUBLESHOOTING VIDEO CONTENT DELIVERY NETWORK

FIELD OF THE INVENTION

The present invention relates to a system and method for synthesizing and distilling a large number of log and event messages in a complex and distributed video content delivery network into actions, including providing a small number of informative display messages to a display, trigger the sending of an electronic message, or other automated response. In particular, the present invention relates to a system and method for the centralized collection and analysis of log and event messages by retrieving events from a wide variety of log file sources, applying rules with a rules engine in a nested or linear sequence, and the subsequent generation of informative messages based on the application of flexible rules to the stream of log messages, thereby identifying performance limitations and errors which are present in the system being analyzed.

BACKGROUND OF THE INVENTION

FIG. 1 shows an example video distribution infrastructure 100 for packet-based video using the internet protocol (IP). Residential equipment 140 includes A/V equipment 148 which receives a video stream from Set Top Box (STB) 146, which video stream is formed from video payload content of IP packets streaming through a residential gateway 144 which is coupled to a service interface 142. Other IP equipment, such as a wireless local area network (WLAN) 150 may share gateway 144, and for troubleshooting purposes, a technician may bring packet capture equipment 147, such as Wireshark software, to determine the cause of a problem in the network. Each delivery media type may include a service interface 142, examples of which are a DSL modem for Digital Subscriber Loop carried on a telephone twisted pair, a cable modem when the backbone media is a distributed coaxial cable television, or a fiber adapter for optical fiber media. Other service interface types may be used, including fiber interface, or any physical layer which allows a network connection to a high speed backbone. Since the various delivery media aggregate to a central distribution point, aggregator 132 concentrates the data streams of the various customers specific to each media type, such as a central switching office (CO) for telephone DSL, cable delivery infrastructure for cable TV coax, or other aggregation equipment 132, which is connected to a high speed backbone to internet routing distribution 130 through switches and routers which interconnect to other remote locations. One of the functions of STB 146 is buffering of the video stream carried by the IP packets, or local storage of previously transmitted content such as in a digital video recorder (DVR) function of the STB 146. Residential Gateway 144 also operates as a customer firewall, allowing locally initiated TCP connections to external devices and protecting internal local networks such as wireless local area network (WLAN) 150, with the residential gateway 144 allowing incoming connections which are associated with internally generated requests from STB 146 and WLAN 150, and filtering undesired internet traffic from external IP traffic sources such as intruder and exploit sources. Residential gateway 144 may use a variety of different physical media providing a physical connection to a high speed data source, such as video coaxial cable, twisted pair digital subscriber loop (DSL), or optical fiber. In one type of video distribution configuration, nearby branch video services 110 houses an authentication server 118 which acts as a firewall to interconnected equipment inside the branch video services 110, and video application servers 116 authenticate set top box 146 requests and provide the wide range of video services, including video on demand (VOD) servers 124, as will be described.

In the configuration shown in FIG. 1, a viewer may select a particular video-on-demand program to view through a selection interface provided by the STB 146 and displayed on the A/V display 148, using a media control program such as Minerva®, or any other suitable media control software operative on STB 146. The Mediaroom executable program instructions reside on the STB 146 and are executed by a central processor unit (CPU), which then sends a request for the requested content through an associated interface, which request is routed through the Residential Gateway 144 through the Service Interface 142 to aggregation point 132, where the request is delivered for service by Branch Video Services 110. Authentication server 118 acts as a firewall to authenticate incoming requests to ensure the only requesters are registered STB 146 equipment. Requests from STB such as 146 are passed from authentication server 118 to a variety of video application servers 116 which authenticate the request, verify the subscriber has access rights, and provide credentials for the STB to make a subsequent content request to a video source, some of which video sources may be local in branch services 110, or the request for content may be serviced by a resource within backend video sources 122, such as stored video source 112 for video on demand with delivery commonly provided using the Transmission Control Protocol (TCP) of the Internet Protocol (IP) or from live video source 114 with delivery commonly provided as User Datagram Protocol (UDP) packets, which TCP or UDP packets are thereafter directly delivered to the requesting STB 146 through connections and/or IP destination addresses which were established from the STB to the particular video source using request parameters provided by video application servers 116. Branch video services 110 may be replicated and distributed through the network either with region-specific content, or for balancing network resource demands, one example of which is shown in replicated branch 120 with authentication server 128, video application server 126, and VOD servers 124. Other residential equipment 152 may be coupled to aggregator 132, and other aggregators 133 may be coupled to residential equipment 154, 160, which may contain similar equipment as was shown for residential equipment 140.

There are several methods for requesting and delivering content in FIG. 1. In one method, the STB 146 receives program guides from one of the branch video application servers 116, or a video on demand (VOD) server 124, or the video application servers 116 authenticate and pass the request to the STB for direct delivery through the internet cloud of routers 130 to remotely located servers 112 and 114.

As can be seen from the many steps of content delivery in FIG. 1, there are many individual steps involved in processing a request from a STB which results in the delivery of video content, with several single point of failure nodes and combinations of conditions which result in failure to deliver requested content. Any one of the many elements of FIG. 1 may not be working optimally, overloaded with requests or traffic, or improperly configured or improperly operating. The user experience when any of these conditions occur is complete loss of service and an urgent telephone call to the provider of the video on demand. Additionally, it is time consuming for the provider to determine the source of the particular problem, or the overall scope of the problem other than by judging from the number of customer complaints received, and the provider would additionally like to troubleshoot problems during times of minimal use, or perform network monitoring to determine overall network health and address performance issues before they begin to effect customers.

Each element of request processing and handling involves a server with an associated event log, and the processing of a request occurs sequentially involving many servers, each of which needs to correctly complete its processing before the request is passed to the next server in the sequence, and each of the servers maintains a log of transactions based on servicing each request. One of the primary reasons that it is challenging to troubleshoot and identify problems in a distributed network with sequential requests such as a video server infrastructure is the sheer number of such logs, the high number of transactions per unit time which are recorded in them, and the need to review the contents of each log in detail to identify the source of a performance problem or failure. It is desired to provide an automated and flexible system for identifying failures and to provide high value distilled performance information using the wide variety of logs and event messages which may be gathered and processed.

OBJECTS OF THE INVENTION

A first object of the invention is a rules engine for retrieving events from a plurality of log files, applying the log files entries to a set of reconfigurable rules, and generating a consolidated list of possible error causes or performance observations by forming a single stream of log messages from all available message logs and synthesizing the large number of log messages to a consolidated set of important result messages or actions which arise from applying a set of rules to log entries, used in combination with a rules engine.

A second object of the invention is a method for the generation of troubleshooting rules which establishes a hierarchy of functionality with respect to equipment which surrounds a management server, and where the management server is acquiring logs and applying troubleshooting rules to those logs to generate a series of actions.

A third object of the invention is a process for applying rules to a stream of log and event messages in a sequential manner, and which identifies a likely failure cause.

A fourth object of the invention is a rules engine which filters events from a plurality of sources by merging them into a single stream of messages, each message having a timestamp, a log source, a severity code, an error type, and error message, thereafter applying rules to the single stream of messages, each rule having an associated action, and taking that action when the rules engine determines that a match to a particular rule or a match to a sequential group of rules forming a scenario has been found.

A fifth object of the invention is a rules engine which issues commands to a set top box (STB) or other device in a network, where the STB responds to the commands by making resource requests to a network with distributed logs associated with the handling of those requests, the distributed logs being processed by the rules engine for match conditions, the match conditions generating actions which include the display of an error message, issuance of an electronic communication such as an email, or the generation of additional rules to be processed by subsequent log events, or by the generation of additional rules to be retrospectively applied to log events which preceded the match condition.

SUMMARY OF THE INVENTION

A rules engine operates using a plurality of message acquisition threads which read and merge a plurality of event or log messages into a single stream of messages. A sequence of rules is formed which identifies particular failures specific to a particular network, with actions of the rules established which identify root causes of failure, and the rules are ordered according to a hierarchy which establishes network functionality of the parts of the network which are required to be operating before examining messages associated with other parts of the network which rely on the predecessor parts of the network to be functioning. Examples of network failures which generate log and event messages which can be detected by the rules matching log messages include loss of network connectivity, loss or impairment of server functionality, loss or impairment of resources required by the server, or misconfiguration of required network resources, including other servers and network attached devices. The event and log messages are applied to a series of rules by the rules engine, each rule identifying a log source, a match condition, and an action upon match or failure to match, the possible actions including at least one of: subsequent processing by another rule in a scenario of rules, the generation of a message based on the likely underlying failure which has generated messages which match a rule or scenario of rules, the termination of application of subsequent rules, or the application of a set of rules specific to the match condition. The match condition may include one or more comparison operations between an identified field and a value for that field indicated by the rule, with a successful comparison or unsuccessful comparison of a rule having an associated action to be performed subsequently.

In one embodiment of the invention, a flexible and reconfigurable set of rules initiates certain events as input stimuli and reviews the resultant log file results to determine a failure cause.

In another embodiment of the invention, a set of reconfigurable rules are applied to messages produced by a plurality of different devices, the rules applied either on a one-time basis or on a continuing basis to indicate likelihood of failure from traffic congestion.

In another embodiment of the invention, a set of reconfigurable rules are applied to retrieved events from a plurality of event sources to troubleshoot a video delivery network.

In another embodiment of the invention, a request is made for log file events which span a particular time interval, the events are applied to a set of rules, thereby generating a set of intermediate cause results and a set of final cause results, where each set of intermediate cause results causes an additional set of rules to be applied until a final cause result is identified.

In one embodiment of the invention, the log and message events are from an event log. In another embodiment of the invention, the log and message events are from a web log. In another embodiment of the invention, the web log is a W3C log. In another embodiment of the invention, the log and message events are captured packets from a network. In another embodiment of the invention, the captured packets are in PCAP format from a packet capture program such as Ethereal or Wireshark. In another embodiment of the invention, the STB generates a set of diagnostic logs which include CPU utilization, memory utilization, errors experienced by the STB, and the STB sends this log through the network to a network node which is accessible to the rules engine, and rules are present which are responsive to entries generated by this log and generate actions upon rules match with these diagnostic log entries.

BRIEF DESCRIPTION OF THE DRAWINGS

FIG. 6D shows a format for the entries of a client trace log.

FIG. 6E shows an example entry in a client trace log.

FIG. 6F shows an example variable length event log entry.

FIG. 7A shows the generalized format for a filter rule.

FIG. 7B shows an example rule for a W3C log.

FIG. 7C shows an example log entry matching a rule of FIG. 7B.

FIG. 7D shows an example rule for a client trace log.

FIG. 7E shows an example trace log entry matching the rule of FIG. 7D.

FIG. 7F shows a rule example for a unicast failure in an event log.

FIG. 7G shows a log example for a unicast failure.

FIG. 7H shows a rule example for purchase and play a movie.

FIG. 7I shows a W3C log example for purchase and play a movie.

FIG. 8A shows an example of nested rules for a problem scenario.

FIG. 8B shows an example of nested rules for a problem scenario.

FIG. 8C shows W3C log entries for a successful power-on initialization.

FIG. 8D shows W3C log and client trace log for an unsuccessful power-on initialization.

FIGS. 9A and 9B are flowcharts for rules execution.

DETAILED DESCRIPTION OF THE INVENTION

Figure 1:
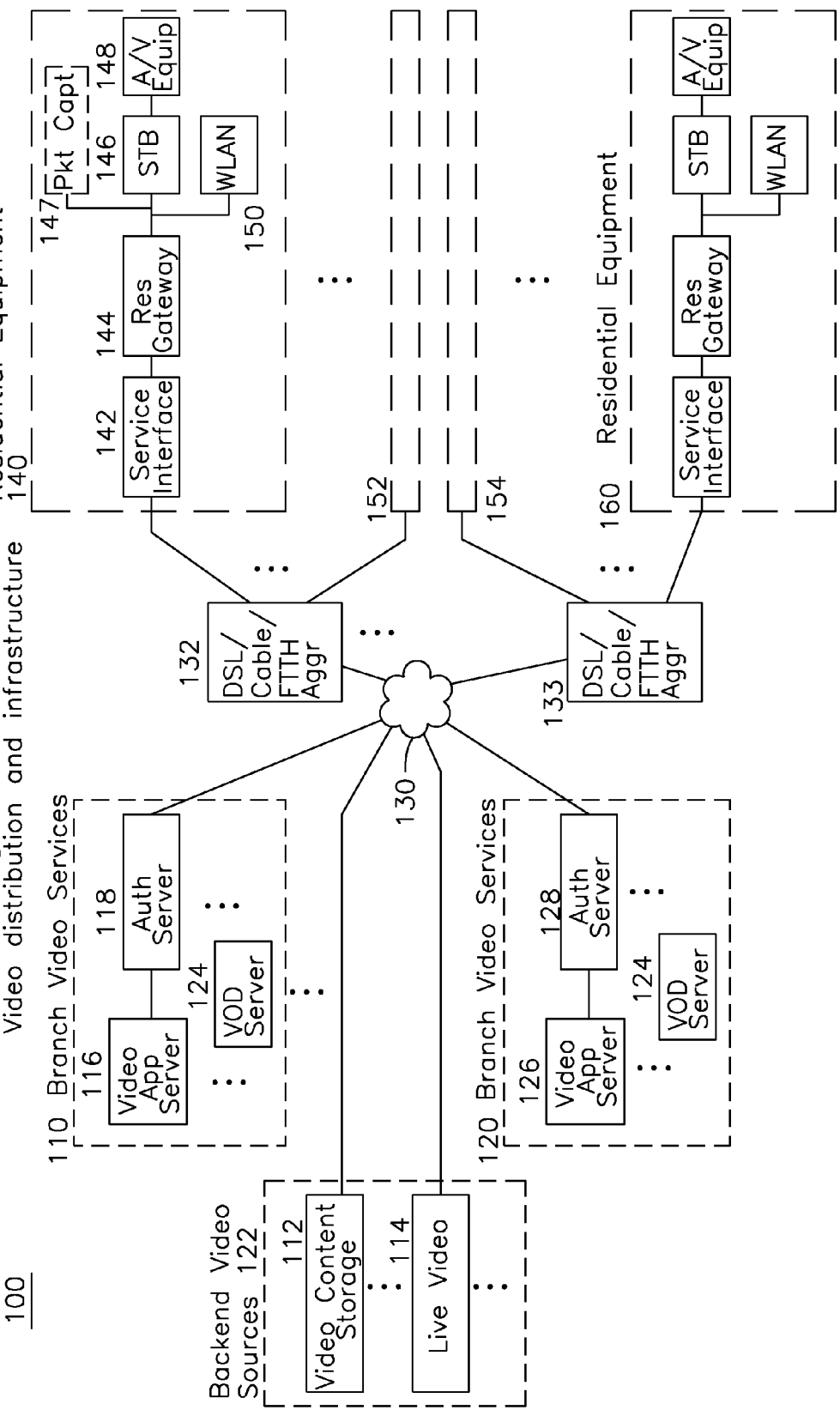
FIG. 1 shows the block diagram for an exemplar video delivery infrastructure.
Figure 2:
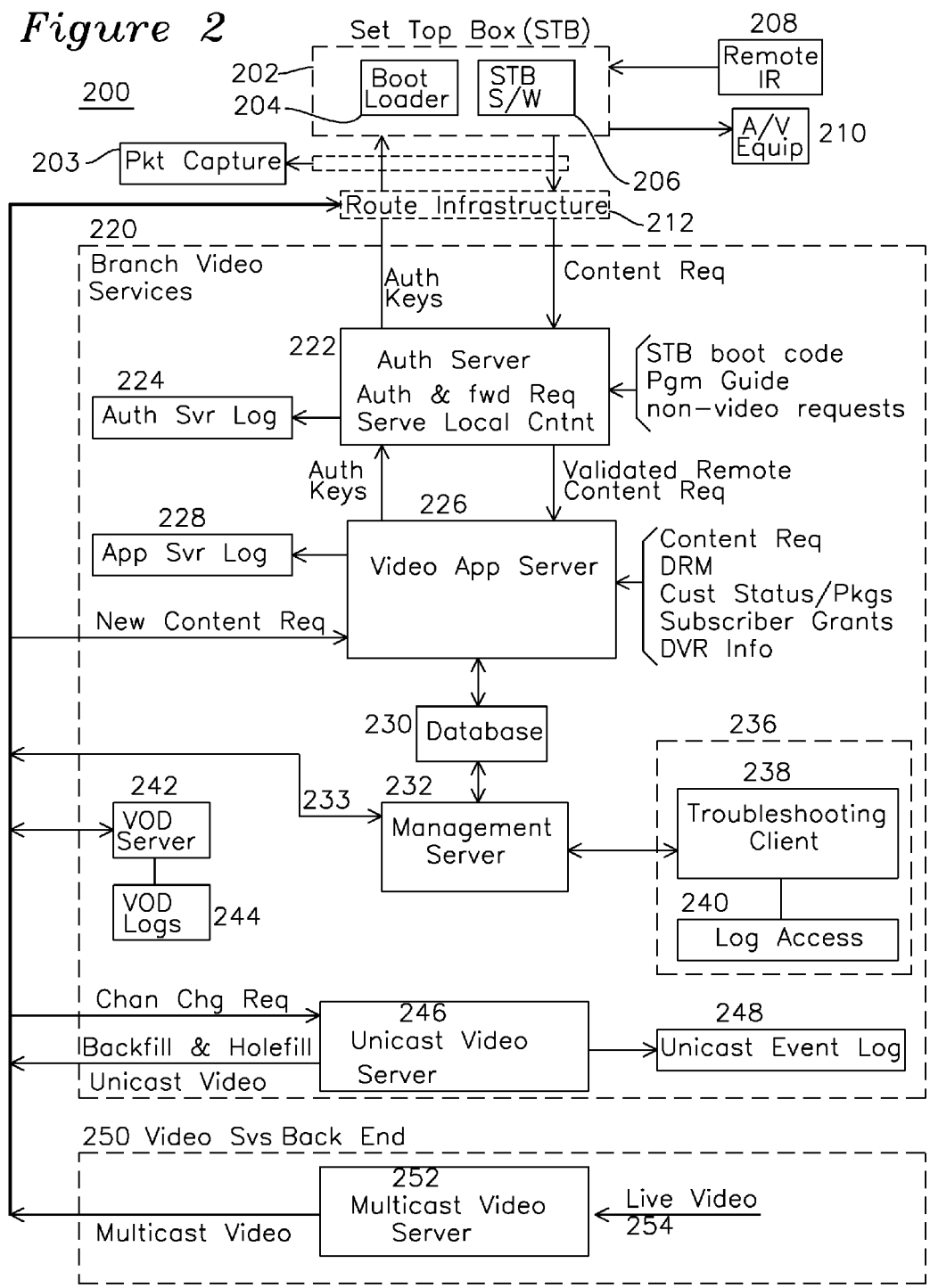
FIG. 2 shows the block diagram for a video delivery infrastructure which includes servers which may be involved in processing a video request.

FIG. 2 shows a block diagram for a video content delivery system 200. A set top box (STB) 202 includes a boot loader 204 which contains instructions for downloading STB operating software 206 such as Microsoft® MediaRoom® from an internet port coupled to a route infrastructure 212. The Set Top Box 202 may be locally controllable using a remote control 208 which may operate using Infrared (IR), Bluetooth, or other wired or wireless communication. Typically, the STB 202 generates audio and video signals which are directed to AV equipment 210 such as a flat screen monitor or television. Route infrastructure 212 contains all of the routing and signaling equipment on the path between STB 202 and authentication server 222, for which content requests are made by the STB, as shown. In one example, a large number of STBs in a particular geographical area are managed across connections through route infrastructure 212 by a particular video services branch 220, but only STB 202 is shown for clarity. As the authentication server 222 is directly connected to the internet route infrastructure 212 and exposed to potential hacking exploits and security attacks, it also acts as a firewall router and prevents unauthorized access to any of the equipment and services enclosed in the branch 220. The authentication server 222 initially receives a boot request from STB 202, which causes authentication server 222 to deliver STB boot code 206 from server 222 to the boot loader 204, which ensures that the software 206 of STB box 202 is always current and delivered from a controlled source 222.

Once the STB 202 boots and loads software 206, it requests and is delivered the channel selection program guide from authentication server 222. Authentication server 222 additionally delivers any non-video data requested by STB 202. When the user instructs STB 202 to select a particular program, this STB content request is delivered to authentication server 222, which validates the request and sends it to video application server 226, which accesses a customer database part of database 230 to determine whether the STB 202 has a subscription plan which includes the requested program. If the content request is approved, the video application server 226 returns authentication keys to the authentication server 222, which forwards them to the STB. The authentication keys include a destination server address and authentication credentials which are presented to the video server for content delivery. If the STB content request is for a video on demand, the video request is served by VOD server 242 inside the branch video services 220, or if the content request is for live video such as content from a syndicated satellite feed, this request is served as a channel change request to multicast video server 252 and unicast video server 246. The unicast video server 246 responds by sending unicast video packets during an initial interval before the multicast connection is set up, and the multicast video server 252 responds to the request by adding a multicast connection for the requesting client, such that the requested content is served from a centralized video services back end 250 which contains many such multicast video servers 252, each of which streams the content such as live video stream 254 to a variety of different subscribers, including the newly requesting STB 202. In this manner, the channel change request is initially served by the unicast video server 246 which instantly serves the broadcast material as unicast packets until the multicast video server 252 completes the multicast connection request and adds the STB 202 to the list of multicast recipients, after which the video packets are delivered by video back end server 252 from live video feed 254. Unicast video server 246 also monitors the stream of retransmission requests from STB 202 which indicates that multicast packets were dropped through the infrastructure 212, such as from congestion, and unicast server 246 services the retransmission requests, thereby providing "back filling" services by serving the missing packets which were requested by STB 202.

Video applications server 226 handles all video content requests from authentication server 222, and server 226 also handles digital rights management to provide the decryption keys to a requester for content that may arrive in an encrypted form. The video applications server 226 uses database 230 to verify customer status and available packages for the customer, any content permissions that have been provided, and information about the subscriber's digital video recorder (DVR) within the STB 202, such as the maximum duration of digital recording. Information related to these rights and permissions is stored in the customer data part of database 230 which contains per-subscriber information such as DVR information and the association between a particular customer and a particular STB MAC address, for example, whereas a group data part of database 230 is accessed by the video application server, and contains information related to the set of content which is available to a subscriber with a particular level of service agreement.

Management server 232 performs overall management functions and can be realized as a general purpose computer which executes programs that provide overall management services to the branch 220, and which communicates through a local network connection 233 to the various servers in the video branch 220. Branch Management server 232 also hosts the troubleshooting client services 236, which include a troubleshooting client 238 containing the rules processing engine, the rules and rules hierarchy which are realized in the order of the rules, and also hosts log access services 240, which reads the various event logs in the video services branch, such as by using one process thread per remote log. Among the logs which are accessed by log access threads 240 are the authentication server 222 W3C log 224, which contains access request events and content delivery events such as secure and insecure http web service events, video application server 226 log 228 indicating W3C indicating digital rights events, events such as client diagnostic trace events originating in STB 202 and which are stored as database 230 events, and video on demand (VOD) server 242 logs 244. The video application server log 228 includes events such as requests for content and authentication or privilege errors which result from the requester not having subscriber permissions and the results of digital rights queries for the content requested. Video on demand server 242 generates event log 244, which saves the content request and delivery result for each request. Unicast video server 246 maintains an event log 248 which indicates when a channel change request has occurred and also indicates whether subsequent unicast packets were delivered, and backfill requests from video application server 226 or STB 206 indicate whether a video gap event occurred for a particular stream, indicating a network problem such as network capacity underrun, or video server 252 problem, either of which benefits from early detection and correction. The periodic access of unicast server 246 for video gap filling would indicate a level of congestion or server oversubscription for multicast video which should be serviced without interruption by server 252. The STB 202 also has a diagnostic mode, where requests to the STB 202 and its responses may be logged as events and saved into diagnostic log part of customer database 230, with the stream of logged events for a particular STB forming an event trace. Log access thread 240 provides a method for requesting event and web log status for each of the logs 224, 228, 240, 248, and 244, the results of which are filtered by troubleshooting client 238. Because it requires a sophisticated user and the packet captures are time consuming to examine, packet capture is typically not performed in the field. Using the rules-based troubleshooting client 238, it may be preferable in one mode of the invention to capture packets 203 in the field using client software such as Ethereal or Wireshark, and forward the results of that capture to troubleshooting client 238, which may apply rules and associated rule actions to do performance testing or to determine an underlying failure mode. Similarly, packets from any of the servers or network attached resources may be captured and subject to rules-based processing for detection of error conditions and to generate actions as described earlier.

The troubleshooting client 238 may also perform diagnostic tests by taking control of the STB 202 such as by having client 238 issue commands to the STB 202, with the response of the STB 202 causing log entries which the rules of client 238 may process and use to generate new subsequent actions which are conditional on the outcome of the preceding rule matches. For example, the STB 202 can be issued commands by the troubleshooting client 238 to sequence through all of the available channels for a duration of time sufficient for a short stream of steady-state video to be delivered, and the client 238 can thereafter process the log results to ascertain normal or abnormal network responses, with the rules having an associated action which performs more detailed inspection of the system through additional commands to the STB 202 and associated rules. In the channel tuning example, errors associated with specific channel sources could be determined by examination of unicast event log 248, and a rule which matched a log condition corresponding to loss of video source could generate an electronic message such as an email or other notification for correction of the network error. Other commands which the troubleshooting client could issue include instructions to the STB 202 to purchase and play a movie, or launch an application (such as a game).

Figure 3:
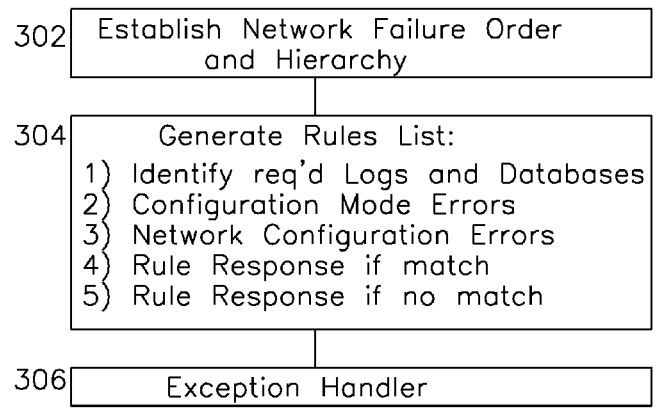
FIG. 3 shows a flowchart for a rules application engine.

FIG. 3 shows an example for rules generation. A first step 302 establishes the network hierarchy and failure order such that the rules are applied in a manner which provides maximum information on the network performance and errors, typically in an order and manner where requisite subsystems are initially determined to be reachable and functioning by the troubleshooting client resident in server 233 of FIG. 2 before higher level tests are conducted. For example, from FIG. 2, the STB 202 is not operative until the boot loader 204 requests and loads boot code and software 206 from the authentication server 222, which represents pre-requisite functionality before performing subsequent performance analysis. A filter rule which establishes that the boot loader and software loading was successful would be necessary prior to processing error messages related to content requests, since the STB 202 is unable to make such requests until the boot code and software 206 are loaded and executing. There are many such initial requirements in any exemplar network that must be met before detailed network performance measurements can be meaningfully made, including establishing that the servers are operational and reachable. Therefore, rules which detect these low level errors are executed prior to the execution of rules associated with higher level functionality, which functionality may be asserted in the actions associated with the rules. The rules generation steps are shown in outline form in step 304, and include the first step of identification of required logs (event, server, and diagnostic trace), as well as the identification of any databases used to store trace events. In the example FIG. 2, these would be authentication server log 224, application server log 228, database 230 which may store diagnostic trace events from the STB 202 during a diagnostic mode, video on demand (VOD) log 244, unicast video server event log 248, and other logs which may be available. In a second step of 304, a first set of filter rules are generated which identify configuration errors such as one or more unresponsive servers, impaired or not properly operating servers, set top box configuration and operation errors, including errors such as inaccessible digital rights by application server 226. In a third step of 304, rules are generated which identify network configuration errors such as an unreachable multi-cast server 252. In a fourth and fifth rules generation step 304, the response of each rule to a match or failure to match condition is determined. In the present simplified example, the response of a matched condition is to issue a message specific to the matched condition and contained in the rule, and the response of an unmatched condition is the application of subsequent filter rules, which follow the same action of sending a message if a match occurs, or moving to the next rule of a particular scenario if a match does not occur. Step 306 is an exception step which indicates to an operator that a new rule may be required if no match occurs by the end of the application of the current rules during a known error condition.

Figure 4:
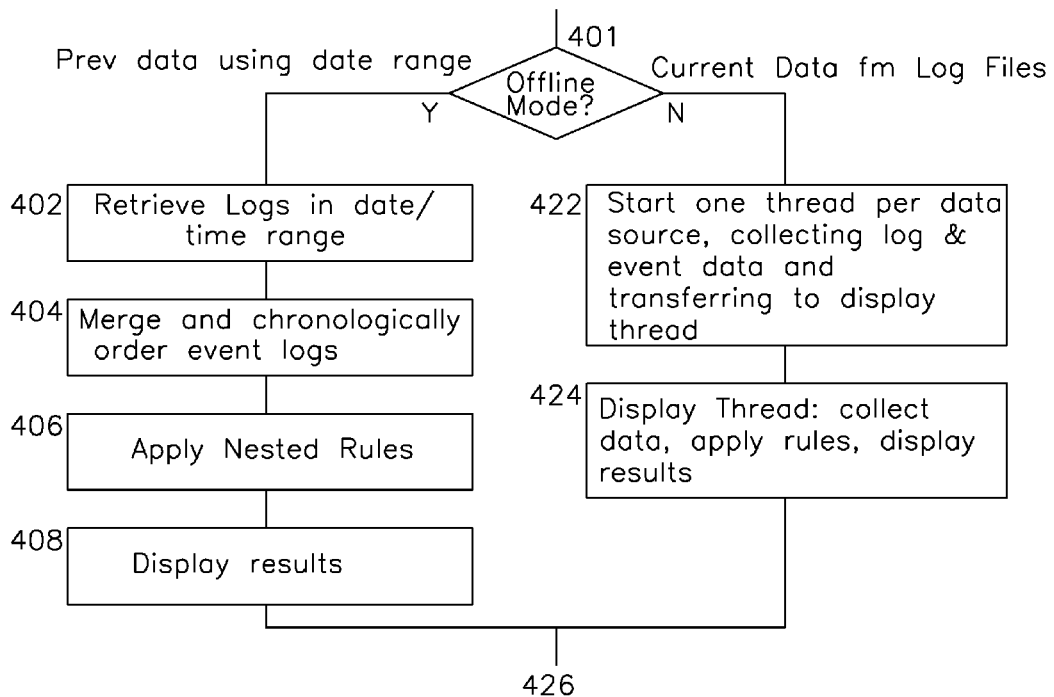
FIG. 4 shows a flowchart for the application of rules generated in FIG. 3.

FIG. 4 shows a flowchart for the application of filter rules, which are applied to either merged log data which was previously acquired (offline mode) in steps 402, 404, 406, 408, or using merged log data from incoming present events 422, 424 (on-line current processing mode). In off-line mode reviewing previously collected data, log entries from a particular date and time range are retrieved, such as by separate threads for each log in step 402, and these events are merged into a single stream for processing. In step 404, the various log file entries in the single stream are merged and sorted by date and time so that the merged file contains a single continuum of message log and event data which is chronologically ordered. In step 406, the rules generated in FIG. 3 are applied in a nested manner by scenario for each possible error root cause, such that the order of rules provides the most granular result message, although some rules may be skipped of certain conditions are met, which conditions may be expressed in each particular rule. In step 408, the results of the rule application are presented, such as in a status or display window region of a display or monitor. In on-line mode, where the data is real-time and arriving from a variety of logs, a separate acquisition thread is started for each log 422, and these are fed to the rules engine and display thread 424, which presents the results of the rules engine application, such as in a display window as was previously described. The rules application steps exit at step 426.

Figures 5, 6A, 6B, 6C:
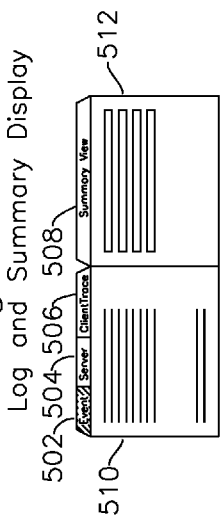
FIG. 5 shows a display of output generated by rules applied to logs.
FIG. 6A shows a generalized log entry format.
FIG. 6B shows the format for a W3C log server entry.
FIG. 6C shows log entry examples for a W3C server.

FIG. 5 shows one embodiment of the invention where the individual logs are merged together into individual windows by log type, such that all of the events and log messages are presented in window 510 which has separate tabs for viewing of the merged event messages 502, a tab for viewing merged server logs 504, and a tab for client trace diagnostic messages 506, such that within window 510, a user may select one of these logs for source message viewing. Adjacent to the original source message window 510 is summary view window 508, which contains messages generated by actions of a rule match, which in the present embodiment of the invention may be in the form of an informational message which translates one or more detected log events into a corrective action text message, or a suggestion of additional testing which may be required to further narrow the likely cause of the problem being investigated.

FIG. 6A shows a generalized log entry format, where a sequence of fields each are presented as values 602, 604, 606, and 608. This generalized format may include delimiters which indicate the individual field values which are presented in a particular unchanging order such as is the case with server logs, or the format may be a free-form variable number of fields and values, such as an event log, which examples will be presented in subsequent figures.

FIG. 6B shows an example for a W3C log entry format, where a sequence of values are emitted in a fixed order configurable by the particular server which generates them. The standard W3C server log, such as from a W3C compliant hyper text transfer protocol (HTTP) web server, includes a date value 620, time value 622, client ip address 624, client access method 626 (typically HTTP GET or POST as is known in the hypertext transfer protocol), TCP port number 630, uniform resource locator (Uri) 628 which indicates the path and file to be accessed or executed from a root file location which has been configured into the server, the responding server's ip address 632, the user agent string 634 identifying the browser type, http code 636 which indicates the return value, typically "OK 200" for a successful transfer or 4xx/5xx for a failed transfer with xx indicating the particular failure type. For example, the HTTP return code "404 Not Found" indicates an access attempt to a non-existent file, "Forbidden 403" indicates a permission violation when accessing a file, and "Internal Error 500" indicating a server processing error. Request length 640 indicates the length of the received request, and response length 642 indicates the length of the response that was sent. Server code 638 is the code returned by the server, typically 0 for a windows server running an HTTP web service protocol. Each request and response to the W3C HTTP web server thereby generates a log event which provides summary information about the transaction without providing any of the extensive content of the transaction.

FIG. 6C shows an example W3C log entry corresponding to the format of FIG. 6B. Field 620 indicates the date of the request in YYYY-MM-DD format, and field 622 indicates the time of the request. Field 624 indicates the client (STB) IP address, and field 626 indicates a POST http transfer type to Uri "/login.asmx" 628 on port 80 630 with the server address 632 being 67.160.1.142. The user agent is the requesting STB, which indicates an example value "STB+AGENT+STRING" 634, and the server responded with success code 200 636 a server code 638 of 0 (no errors), and a request length 640 of 40 bytes, and a response length of 73 bytes 642.

FIG. 6D shows an exemplar client trace log entry, which may have fixed or variable fields. In the example of FIG. 6D, the log values follow a specific configured sequence, as in the server logs of FIG. 6B. An error level value 650 indicates whether the trace message is "information", "warning" or "error", followed by date 652 and time 654 of the message, the identifying source 656, an event identifier 658 assigned by the originating source, and a category 660 which identifies additional information specific to the event or error. An example client trace log event with specific values is shown in FIG. 6E, where the level 650 is "information", the date and time 652 and 654 are presented in a different format than the previous example server log, the event source is identified in field 656 with event identifier 1104 658, and an associated message 660 identifies that that a WLAN management session was established over the WLAN interface (659). Each client trace message typically has its own unique set of fields and identifiers which are specific to each application.

FIG. 6F shows a variable length event log example where the field and value are indicated together in the format "FIELD:VALUE" with a delimiter shown as a space between each entry, although the delimiter can be any printable or nonprintable character as known in the art, where the format FIELD:VALUE, which allows the fields and values to be emitted in an arbitrary order and without requiring that all of the fields be sent if they are not relevant to the particular log message. The example of FIG. 6F includes a timestamp string 660 with the time indicated in "unix time" expressing time as the number of seconds after Jan. 1, 1970. For example, a timestamp 1311206400 corresponds to midnight, Jul. 21, 2011. The other fields 662, 664, 666, 670, 672, 674, 676, 678, 680, 682, 684, 686, and 688 relate to fields and associated values which are specific to the particular message being generated.

FIG. 7A shows a generalized format for filter rules of the present invention, which are applied to the various log entries previously described, with each rule responsive to a particular set of log events to generate an action upon match of one or more fields of the corresponding log entry or series of entries. The format for rules to be applied to past events is a date and time range 701 to match (such as for step 402 of FIG. 4 where the events are in the past), so that the events and log entries can be aggregated together before application of the rules, whereas events in the present tend to be self-ordered as they are collected by the various individual process threads which collect them from their respective logs. The example rule format of FIG. 7A also provides for a nested series of rules for a particular scenario, which are applied to the aggregated logs from all sources, as was previously described. Any number of rules with any level of nesting (or scenario) can be provided, and the rules are flexible in format and application. The present example embodiment shown in FIG. 7A includes a which log field 702 to indicate a particular log source to which the rule should be applied in the combined stream, and the rule match condition is specified in variable length fields 704 and 706, although any number of match conditions may be specified for a particular rule. Field 708 indicates what action to take upon a match condition, or what action to take if no match is found. One example of an action on a match condition is the presentation of a message in summary view window 512 with termination of the application of additional rules, or alternatively, the subsequent rules may be applied according to the criteria specified in the rule, each rule having its own match condition and related action. A default example of an action on a non-matching condition is the handling by a subsequent rule, and for a matching condition is termination of the application of additional rules. Rule 1 though Rule m are shown in FIG. 7A to generally indicate any number of rules in use, which may be applied in a specific deterministic order as was described for FIG. 3. The action specified in 708 upon match may also include the addition of fields from the original log message, such as time and date or timestamp, which are displayed alongside the filter match display string (action), such that the display message specified by the rule is accompanied with information or parameters extracted from the original log message, which may be useful to a viewer of the messages in correlating summary messages with the particular log message which was matched to produce the displayed message.

FIG. 7B shows an example of a rule which detects an error condition related to an STB 202 unable to load an upgrade file from authentication server 222 of FIG. 2 because the file is unavailable. The rule field 720 indicates a W3C web server log such as 224 and 228 of FIG. 2, and the match condition fields 724 and 726 specify the strings to search within the merged W3C log entries. The action field 722 "desc=" indicates that the message "Upgrade file unavailable" appended with the actual filename of the missing file taken from the error message is to be displayed in the summary window 512 of FIG. 5 upon a match of the search fields. Nesting of rules may be performed through the use of XML tags such as "<Filter . . . >" 720 open tag and "</Filter>" closing tag 728, which indicate and delimit a particular filter rule. Nesting may be achieved through the use of other XML tags, such as <Scenario . . . > and </Scenario>, which delimit the range of rules to be treated as a group of filter actions to be performed upon satisfaction of the match condition of a particular filter rule. FIG. 7C shows the associated log entry for the filter rule of FIG. 7B, where the W3C log entry is of the format described in FIG. 6B. The "search EventName" field "Application" matches a substring of the ClientApplication.dat and also satisfies the condition of returning "sc-status=404" as seen in the status field of the log entry of FIG. 7C. The result of the rule of FIG. 7B matching the log entry of FIG. 7C is the display message "Upgrade file unavailable ClientApplication.dat", such as in the window 512 of FIG. 5.

FIG. 7D shows an example rule for application to a client trace log, with the first field 740 specifying the filter type matching ClientTrace such as is stored in database 230 by STB 202 by events captured in a diagnostic trace mode and transmitted by the STB 202 to database 230. The rule example of FIG. 7D captures a tuning event (selection of a stream of multicast packets from a new multicast connection after connection setup, and request for unicast packets for the selected channel stream until the multicast connection is established), where the search term is "EventName" matching the text string "Tune", upon which match the message "Tuning from channel 1 to channel 2 on 239.0.1.4:7000 of type HD" is sent to the summary view screen 512, where channel "1" and channel "2" are the channel numbers extracted from the original client trace message of FIG. 7E.

FIG. 7F shows a rule example for matching a message in an event log shown in FIG. 7G. In this rule example, field 750 specifies the particular event log of the combined stream to search, and the match condition is "EventID=650", where upon match, the message "Unicast Server Retry" is sent to the display window 512 of FIG. 5. FIG. 7G shows the particular event log entry (such as from event log 248 of FIG. 2) which satisfies this rule, with the event including the matching field EventID=650 which is displayed in window 512 of FIG. 5 in one embodiment of the invention.

FIG. 7H shows an example of rules for movie purchase, such as a video on demand transaction, where rules 780 and 782 search for "PurchaseMovie.asmx", and the match condition for rule 780 includes "sc-status=200" indicating a successful web transaction (HTTP code 200 indicates success, as was described earlier), and rule 782 indicating a purchase failure is satisfied when "sc-status" is not "200". Additionally, when either rule 780 or 782 is satisfied, an identifier "PurchaseMovie" is present in the rule to enable processing by subsequent rules 784 and 786 as part of a scenario of rules for a particular event. Rules 784 and 786 use the "PurchaseMovie" dependency created by predecessor rules 780 and 782, and each rule 784 and 786 uses a combined match condition based on the string "PlayMovie.asmx" and a successful or failed sc-status value, respectively. FIG. 7I shows the W3C log example files, which are formatted as a series of messages 790 and 792 indicating successful purchases, and 794 which indicates a successful play movie event.

FIG. 8A shows two example sets of rules which detect and report two example failure scenarios, with the rules presented in XML format and organized by scenario. Rules 802 which form a first scenario are applied to detect a login failure by the STB, and rules 804 which form a second scenario are applied to detect an STB upgrade failure, where the "<Scenario . . . " and "</Scenario>" tags indicate the beginning and end of each of the two test scenarios 802 and 804, each of which have their own set of filter rules, indicated by the "<Filter . . . >" and "</Filter>" XML tags. In this representation, "<!- - . . . " indicates a non-operative comment field which is provided to understand the sequence of rules when generated, as is well known in the art of programming and xml. Each filter rule describes a particular log or event source for application of the filter, where the message match conditions specified with the prefix "search" before the field to be searched and followed by the value to match. In one embodiment of the invention, rule matches may be performed using "regular expression" matches, for example, as known in unix, or any method which provides partial matching of a string or character sequence in a message, as required to satisfy the particular filter rule. Additionally, the rule may extract parameters from the log or event message for presentation with action message text in the display window such as 512. One example of string values extracted from the message and presented in the message window is the field indicated "{filename}", where filename is associated with a particular subfield of the log message as was described for FIGS. 7B and 7C.

FIG. 8B shows a series of rules 802, 804, 806, 808, 810 which detect a successful or unsuccessful power-on initialization.

FIG. 8C shows W3C log entries for a successful power=on initialization, and FIG. 8D shows log and event entries for unsuccessful power-on initialization. In FIG. 8C, event 820 matches rule 802, and the message "Downloading firmware"

is displayed. Event 822 matches rule 802, and the message "Authenticate" is displayed. Rule 806 does not match an event in the sequence of FIG. 8C, but event 824 matches rule 808, which results in the message "Login", and rule 810 is only used if the dependency "Ruth" of rule 804 is satisfied, and as log message 826 matches rule 810, the action taken is to display the message "Login". Rules 804 and 806 only execute if rule 802 is a match, since rule 802 indicates "id=Firmware" and rules 804 and 806 indicate "dependency=Firmware", indicating that rules 804 and 806 only execute if rule 802 results in a match condition. Rule 808 also includes a wait for response command, whereby the use of "expirySeconds=3" indicates that the rule should wait 3 seconds for a match condition to occur before taking the action associated with a non-match condition.

FIG. 8D shows log events for an unsuccessful power-on initialization. Log events 830 and 832 match rules 802 and 804, respectively, as for the case of FIG. 8C. Event 834 matches rule 806, resulting in the display message "STB model not valid", which indicates to the service group the particular compatibility problem with the STB failure.

FIG. 9A shows a generalized operation of the rules engine 904, receiving merged log and event messages 902, applying a rules list 906, and generating actions and messages 908 such as the display messages described earlier. FIG. 9B shows a flowchart for the rules engine 904 of FIG. 9A. For each log and event message, a rule is retrieved 910 and if a dependency identifier 912 is found, other rules which are associated with the same dependency are identified and retrieved in step 914. If the rule has an expiry 916, then the process either waits an expiry time 918, or compares to see if the current log entry is more than an expiry time later than the log entry which resulted in the match. The rule is executed in step 920, and if a match occurs 922, the action indicated by the rule is taken in step 924, and the process repeats.

The rule action 924 can include many different forms, including the previously described presentation of a message string for viewing, or the presentation of an electronic message such as an email or text message alert such as to a cellular phone using the SMS or MMS protocols known in wireless cellular communications. By placement of the display messages generated by the rules into an internet server, the messages may be viewed by many different people in different places, as is known in cloud computing. Other rule actions 924 can include the generation of additional rules, such as for use by an automatic learning system, where the detection of a certain number of uncategorized error messages results in the generation of new rules which detect such unhandled messages. Alternatively, the rule can result in a signal being set to a particular server or network resource which is in an impaired condition for a re-boot or re-start, or some other initialization.

In another embodiment of the invention, packet capture of IP or higher layer packets may be done using a program such as Wireshark 203 of FIG. 2, and rules may be prepared which filter the PCAP formatted file which is generated by Wireshark, or any other packet-formatted file with multiple field and value pairs. The rules may then provide for a variety of failure conditions where the STB 202 is unable to provide a diagnostic trace back to the management server 232 and associated troubleshooting client 238. The PCAP file or related packet file may be applied to a local set of rules present on the packet capture device 203 such as a laptop computer which is able to process the packets and generate a troubleshooting result to a local technician who is on-site.

In this manner, an extremely large volume of messages may be expeditiously processed and distilled into a series of display messages which are specific to a particular network topology, configuration, and servers of the infrastructure to which they are applied, thereby producing error messages from the large volume of processed log entries which are very specific to the particular failure at hand. The system of the present invention provides a flexible and reconfigurable set of test and diagnostic metrics which may be applied to understand failures and errors which have occurred in the past (by applying the filters to previously saved events), or by real-time monitoring of the stream of log events and messages which are generated by STB users who are using their systems in personal settings, and the service provider who wishes to monitor system performance and detect error conditions before they become customer complaint events.

In one embodiment of the invention, a series of rules are generated and applied which detect limitations in system performance which may arise during use of the STB and infrastructure during normal operation, thereby anticipating and reporting system performance problems before they occur. For example, rules may be formed for a rules scenario which detects excessive video gap filling from the unicast server after a multicast connection has been established, which would not be noticed by a subscriber, but would indicate a serious limitation in the service capacity of the multicast video server.

In another embodiment of the invention, a series of rules are generated and applied which provide for the understanding of previously logged failure or performance limiting events. In one embodiment of the invention, the rules are applied to previously stored event and log entries, and in another embodiment of the invention, the rules are applied to a current stream of events.

In one embodiment of the invention, one process thread is operative on applying the rules to incoming log and event messages, and the incoming log and event messages are contributed by separate threads, each thread operative on a particular source of log or event entries.

In another embodiment of the invention, the STB such as 202 of FIG. 2 is any computer system with network communications, such as a video gaming system, a desktop computer, a cellular telephone or handheld device operative over a wireless network, or any communications device which accepts requests and generates responses.

I claim:

1. A rules filter operative on a controller, the rules filter for detection and presentation of error conditions, the rules filter having:
   a plurality of rules, each rule having a log identifier specifying a log or event source for application of the rule, one or more match conditions, each said match condition comparing one or more log or event fields with associated match values, and an action to be performed if said rule match condition comparison is satisfied;
   a rules processing thread for applying said plurality of rules to a merged queue of log and event messages, said merged queue of log and event messages generated by a plurality of message log threads, each said log thread operative on a different message log source;
   each said message log thread detecting the arrival of a new log or event messages from a particular source and forwarding said new log or event message to said merged log and event message queue;
   said merged queue of log and event messages sequentially ordered by timestamp prior to application of said rules;
   at least one of said rules comprising a first subset of rules verifying network connectivity, a second subset of rules verifying server configuration, said second subset of rules identifying a non-responsive server, said first subset of rules and said second subset of rules executed prior to a third subset of rules which identifies a failure which requires said first subset of rules and said second subset of rules identify correct operation prior to application of said third subset of rules;

where said action includes the generation of a message which contains information extracted from the associated said log or event which generated said match condition.

2. The rules filter of claim 1 where at least one of said threads is operative on at least one of a W3C server log or an event log.

3. The rules filter of claim 1 where at least one said action includes the generation of a command to a set top box (STB) resulting in the transmission of a response by said STB which is subsequently presented as one of said log and message events.

4. The rules filter of claim 1 where at least one of said threads is operative on diagnostic messages generated by a set top box (STB) in diagnostic mode.

5. The rules filter of claim 1 where at least one of said threads is operative on a packet data capture stream from a set top box.

6. The rules filter of claim 1 where said rules engine generates a display panel which includes a first panel with each log or event message provided in a tabbed window on said first panel, and said display panel also has a second panel adjacent to said first panel which contains messages generated when at least one of said rule match condition comparison is satisfied.

7. A process for a rules engine generating troubleshooting messages for a content delivery network, the rules engine operative on a stream of log events, the process having:
- a rules generation step for generating rules, each rule having a log identifier, one or more rule match conditions, each rule match condition having a field identifier and a field value to compare, each said rule also having an action to perform on a match condition of said rule;
- at least one of said rules comprising a first subset of rules verifying network connectivity, a second subset of rules verifying server configuration, said second subset of rules identifying a non-responsive server, said first subset of rules and said second subset of rules executed prior to a third subset of rules which identifies a failure which requires said first subset of rules and said second subset of rules identify correct operation prior to application of said third subset of rules;
- a log aggregation step where a series of log entries from a plurality of logs are formed into a single stream of messages ordered according to the timestamp of each log entry;
- a rules application step where said rules are applied to said single stream of messages, thereby resulting in a plurality of actions associated with said match conditions;
- a display step whereby said match conditions for each said rule are placed into a display window which includes a summary part containing said actions and a log part containing said single stream of messages.

8. The process of claim 7 where said log aggregation step is performed by a plurality of individual threads, each thread copying messages from a unique log associated with each said individual thread into said single stream of messages, each said log containing messages in chronological order and with a timestamp, thereby resulting in said actions associated with said messages being ordered chronologically.

9. The process of claim 7 where said log aggregation step includes requesting log messages satisfying a range of dates and times from a plurality of logs, ordering said log messages chronologically, and forming said stream of messages from said ordered log messages.

10. The process of claim 7 where said rules generation step includes identifying a plurality of failure conditions which are specific to a particular video content delivery which has said process operative on a particular node of said network, forming rules which detect each failure, and ordering said rules according to the order of detection of error conditions from said node.

11. The process of claim 7 where said network includes a set-top-box (STB) requesting boot code and making video requests, an authentication server validating requests for boot code and also validating video requests, and a video application server receiving validated requests for video;
- said rules generation step including a rule for detecting an unsuccessful boot code request by an STB and having an action which generates a message indicating a boot code request failure;
- said rules generation step including a rule for detecting an authentication failure for a video request and having an action which generates a message indicating an authentication failure;
- said display step including placing said stream of messages into one part of a display and said action messages into a separate window.

12. The process of claim 7 where said network includes a set-top-box (STB) requesting video on demand, an authentication server validating requests for video on demand, and a video on demand server receiving validated requests for video on demand;
- said rules generation step including a rule for detecting an unsuccessful video on demand authentication request and having an action which generates a message indicating a video on demand authentication failure;
- said rules generation step including a rule for detecting an unsuccessful video on demand request from a STB and having an action which generates a message indicating a video on demand request failure;
- and where said rules generation step places said rule for detecting an unsuccessful video on demand authentication request prior to said rule for detecting a video on demand request failure.

13. A rules engine for a video content delivery network, said rules engine having:
- a processor;
- a non-signal computer readable medium that stores program instructions for the processor, the program instructions including:
- a plurality of rules, each said rule having:
  - a log identifier,
  - one or more a match conditions, each match condition including a string or substring match value;
  - an action to take when said match condition is met, said action including a dependency identifier which causes subsequent rules to be executed which have a dependency which matches a particular said dependency identifier;
- at least one said rule comprising a first subset of rules verifying network connectivity, a second subset of rules verifying server configuration, said second subset of rules identifying a non-responsive server, said first subset of rules and said second subset of rules executed prior to a third subset of rules which identifies a failure which requires said first subset of rules and said second subset of rules identify correct operation prior to application of said third subset of rules;
an action to take when said match condition is not met;
an optional expiry timer value whereby said match condition is not tested until a time interval specified by said expiry timer value passes.

14. The rules engine of claim 13 where said action to take when said match condition is met is the display of a message indicated by an associated said rule.

15. The rules engine of claim 13 where said action to take when said match condition is not met is the application of a subsequent rule.

16. The rules engine of claim 13 where any rule with a dependency which matches a previous dependency identifier is executed when said rule with said previous dependency identifier has a match condition.

17. The rules engine of claim 13 where one scenario of rules is directed to providing troubleshooting messages related to the initialization of a set top box, a subsequent scenario of rules is directed to upgrade of a set top box, and a subsequent scenario of rules is related to the verification of set top box certificates.

18. The rules engine of claim 13 where one scenario of rules is directed to the detection of network problems using packets captured from a set top box.

* * * * *